March 18, 1969   J. W. BRAZELL ET AL   3,433,366
GANTRY CRANES
Filed Oct. 22, 1965   Sheet 1 of 14

INVENTORS
JAMES W. BRAZELL
JAMES T. PERKINS, JR.
EDWIN L. WHITE
BY
ATTORNEY

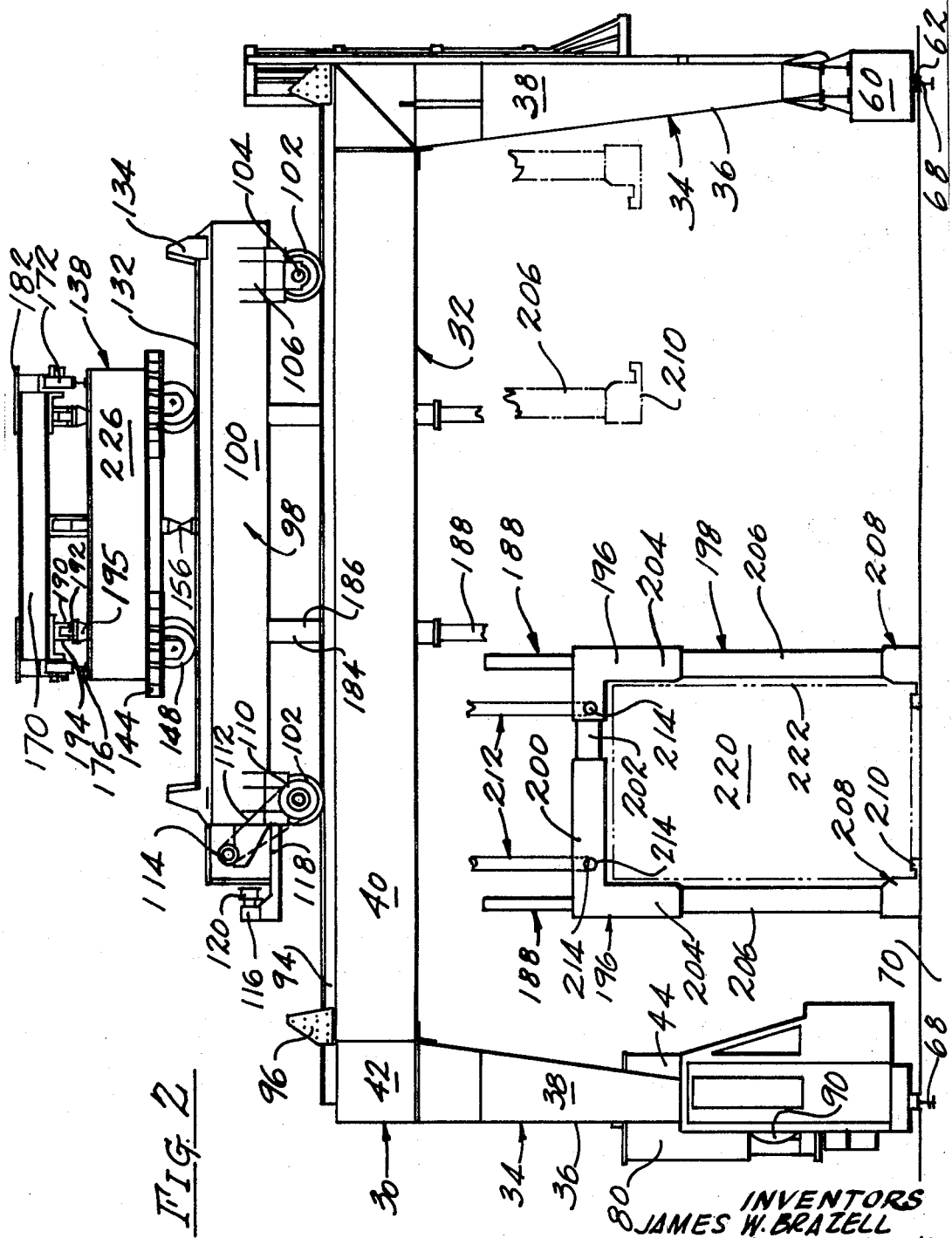

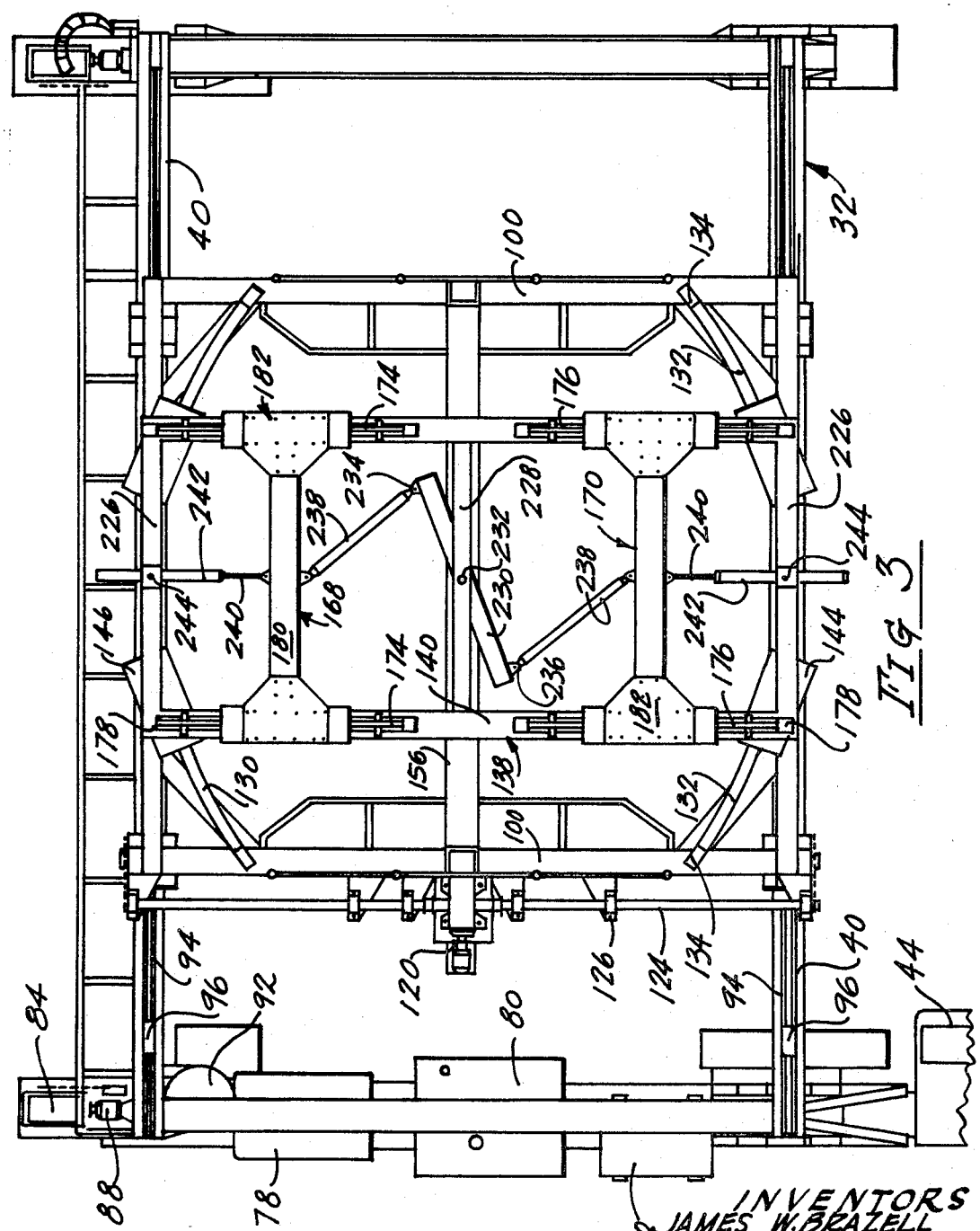

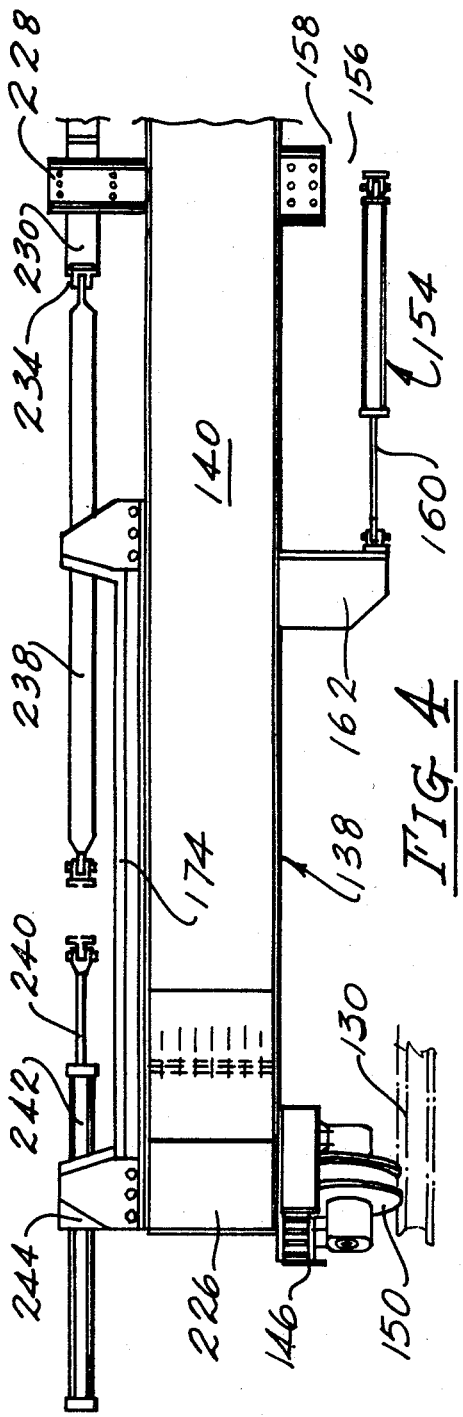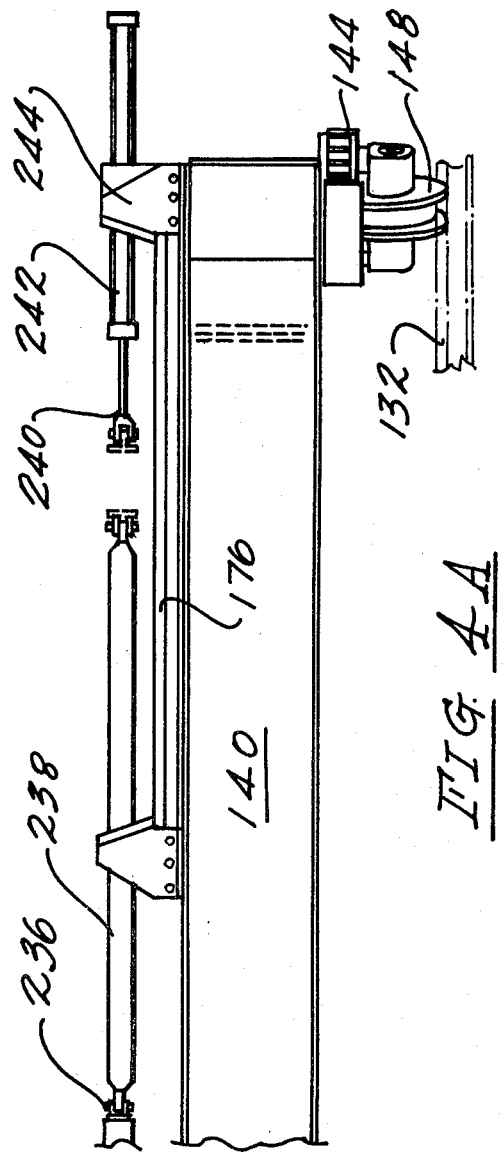

INVENTORS
JAMES W. BRAZELL
JAMES T. PERKINS, JR.
EDWIN L. WHITE
BY
ATTORNEY

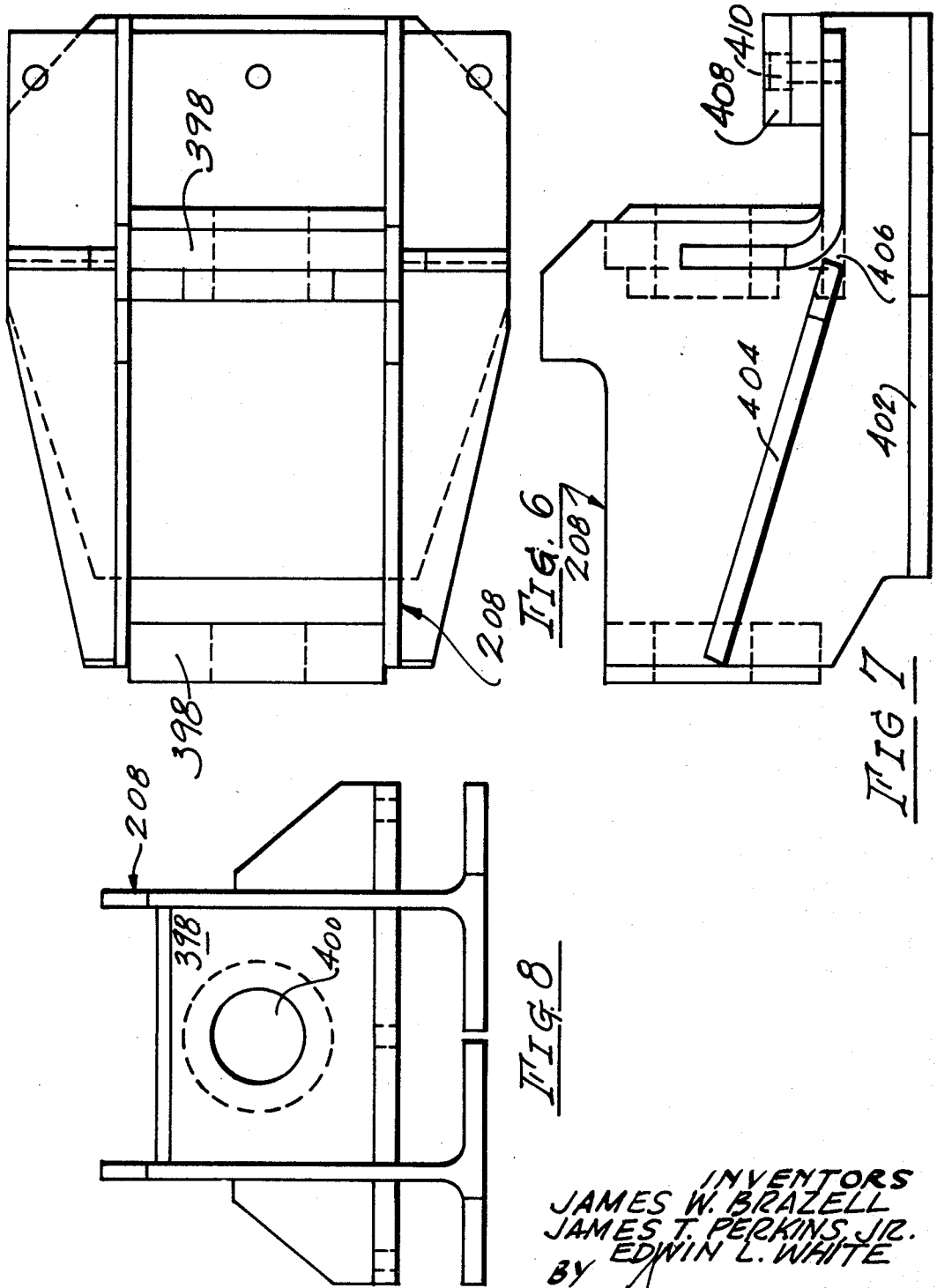

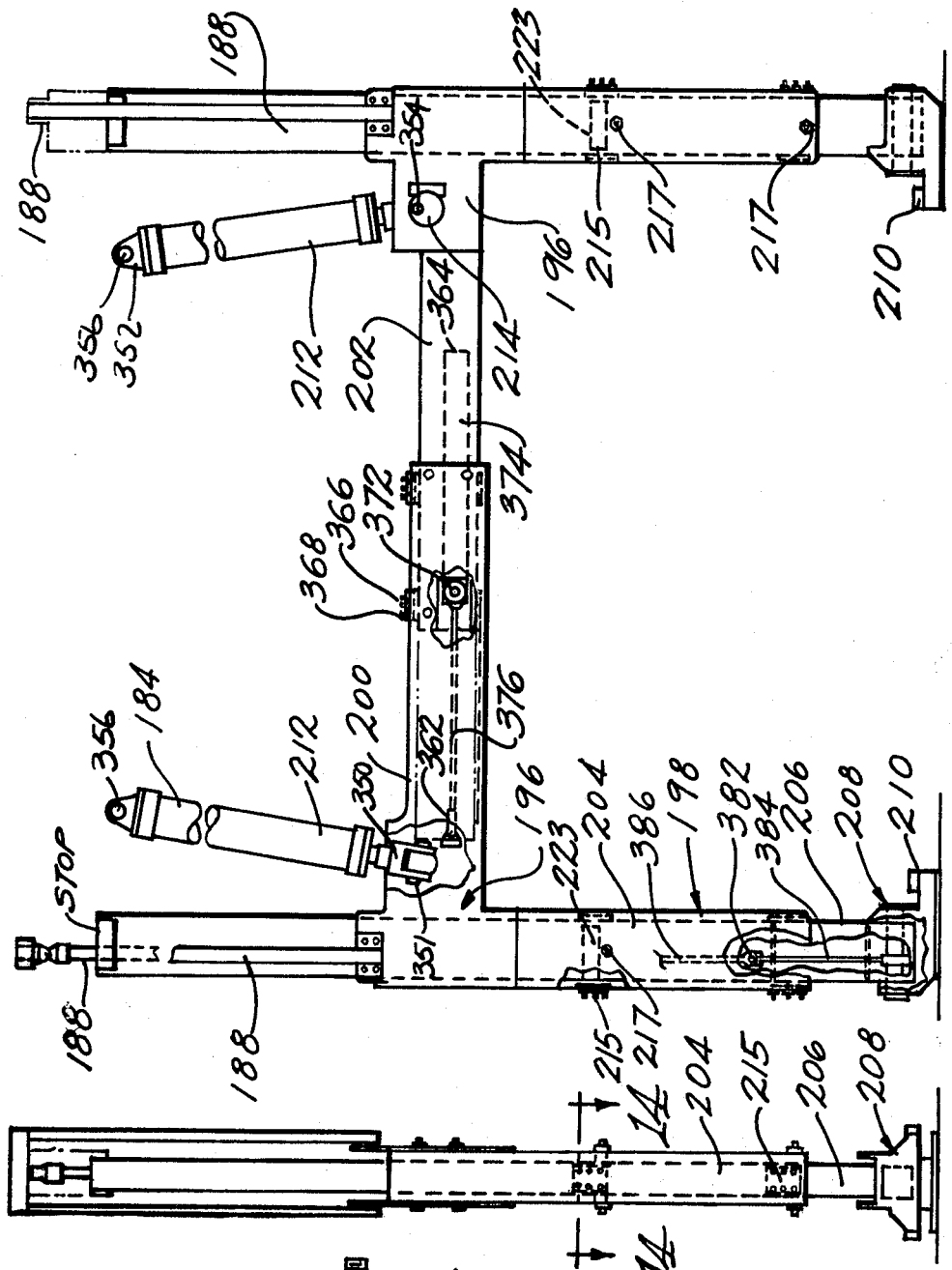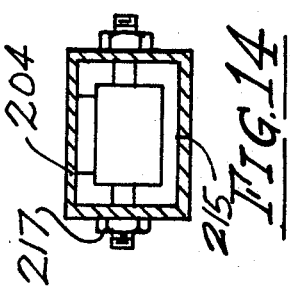

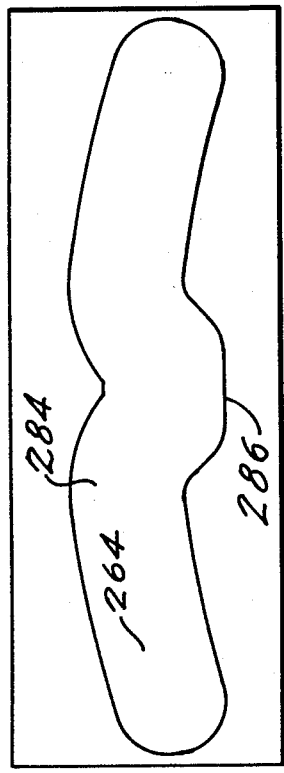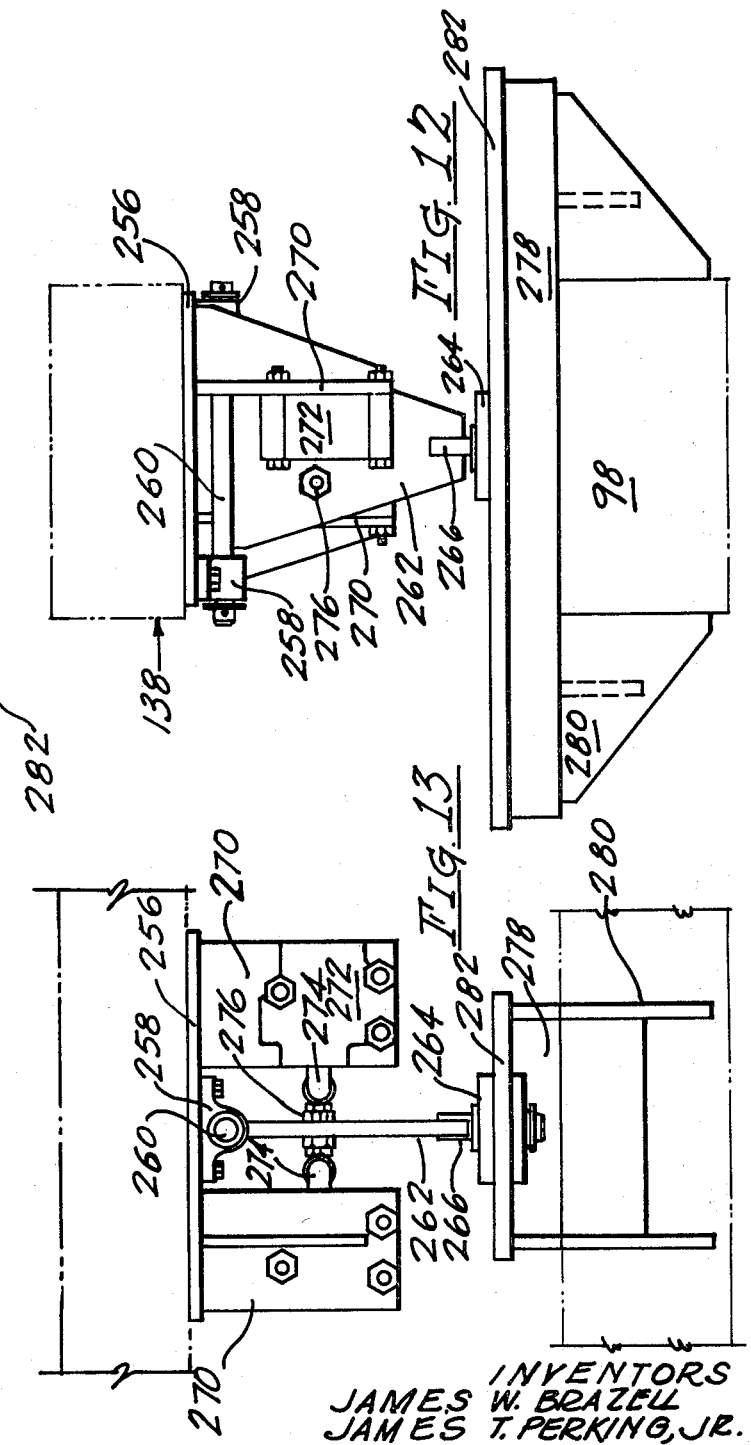

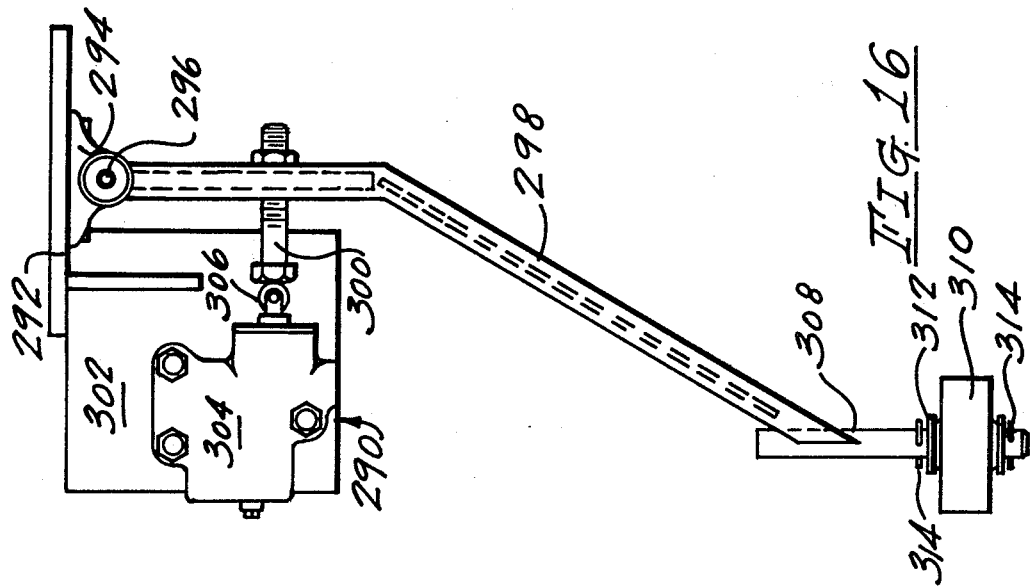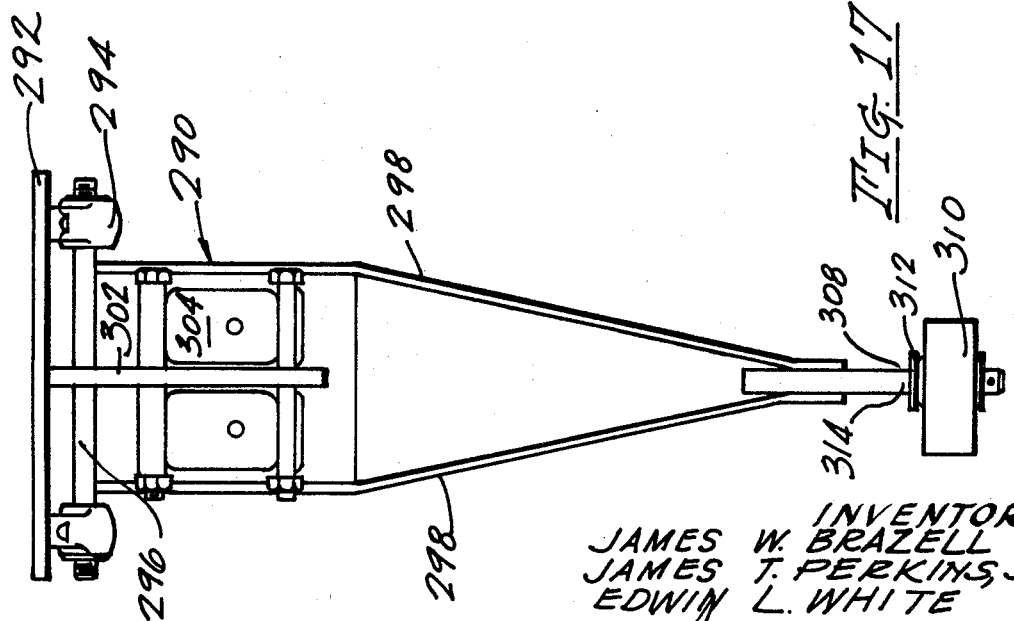

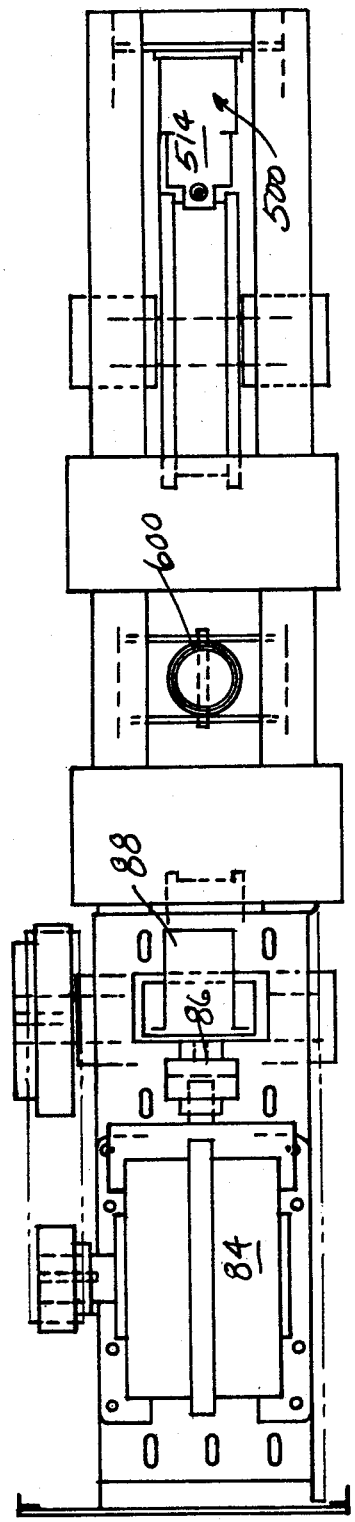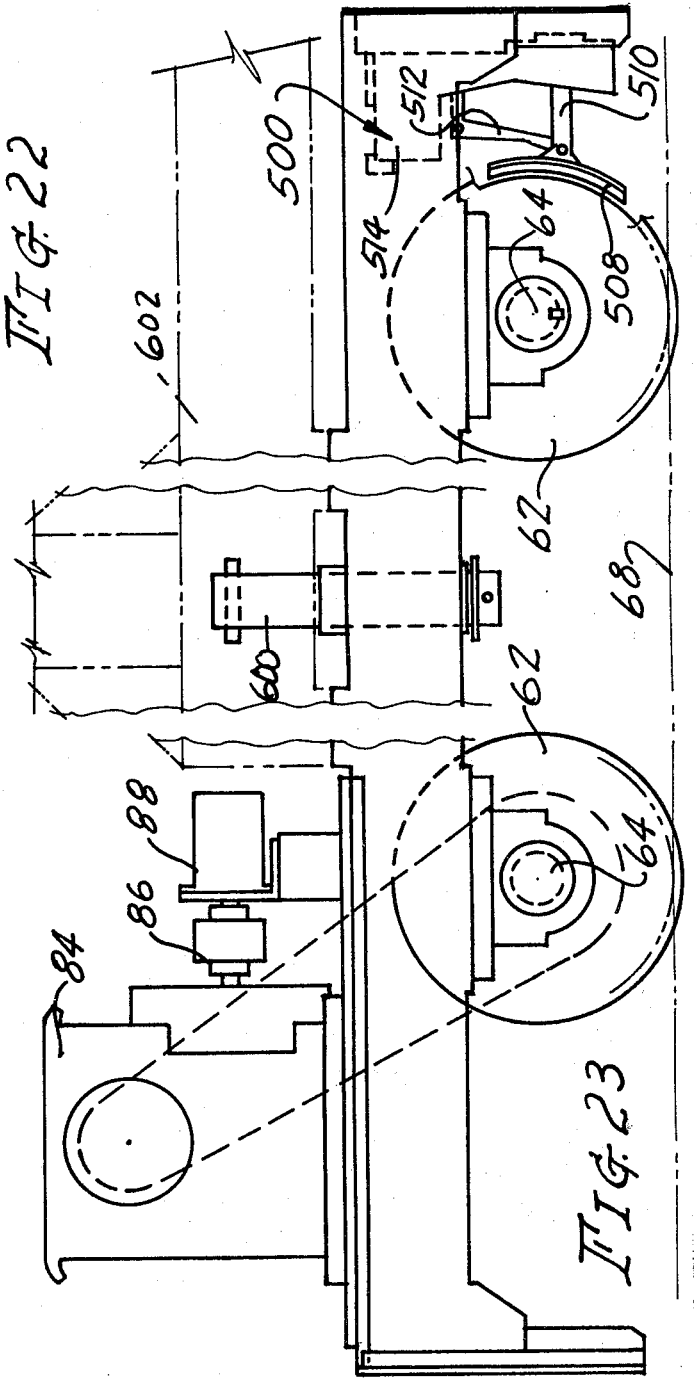

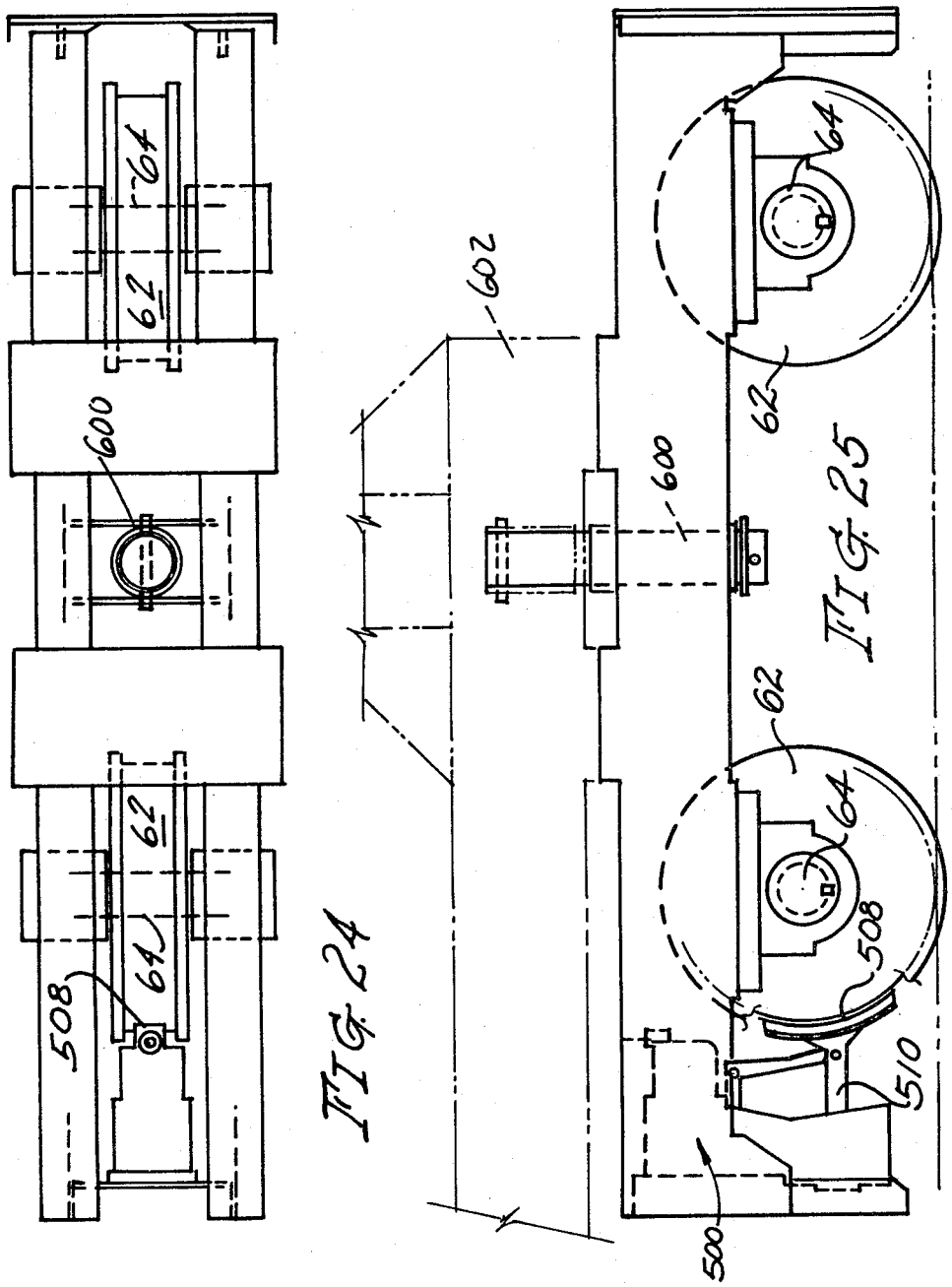

United States Patent Office 3,433,366
Patented Mar. 18, 1969

3,433,366
GANTRY CRANES
James W. Brazell, Fulton County, near Atlanta, James T. Perkins, Jr., De Kalb County, near Chamblee, and Edwin L. White, Atlanta, Ga., assignors to Southern Iron and Equipment Company, Inc., Chamblee, Ga., a corporation of Georgia
Filed Oct. 22, 1965, Ser. No. 500,615
U.S. Cl. 212—14        17 Claims
Int. Cl. B66c 19/00

ABSTRACT OF THE DISCLOSURE

A gantry crane for lifting trailers from railroad cars and depositing same in another location and vice versa. The crane travels on a rail on a crane trolley and has a lifting frame with spaced lifting arms that rotate and which are adjustable and operated together across said gantry.

---

So-called "Piggyback" freight involves the shipment by rail on flat cars of large units or containers, such as trailers, which normally may be used with a tractor for highway transportation. Trailers are loaded then pulled by the tractor-trailer to the freight rail location where each trailer is lifted and placed on a railroad car for transportation to a remote point. After arrival at the destination, the trailers must be lifted from the railroad car and positioned so that a tractor may be driven to and connected to the trailers, which normally may be used with a tractor for highway transportation. Trailers are loaded then pulled by the tractor-trailer to the freight rail location where each trailer is lifted and placed on a railroad car for transportation to a remote point. After arrival at the destination, the trailers must be lifted from the railroad car and posiioned so that a tractor may be driven to and connected to the trailer for delivery to the ultimate destination. The volume and frequency of this operation requires a dependable lifting and hoisting arrangement which may be used in conjunction with the railroad tracks so that railroad cars of "Piggyback" freight may be located at the lifting and positioning device for removing freight trailers from the cars or for placing freight trailers on the cars. The present device is a gantry crane which operates substantially longitudinally along rails that are parallel with the railroad tracks and provides a means thereon for properly lifting large trailers, transferring same relative to the railroad track and then depositing the trailer in proper alignment at another location or vice versa, that is, for transferring the trailers from a location remote from the track to a railroad car on the track.

Generally described, without restriction on the scope of our invention, as defined in the appended claims, the gantry crane comprises an overhead gantry frame having a generally rectangular frame constructed from large, heavy steel members and comprising vertical corner structural column units supporting front and rear transverse horizontal beams which extend overhead. The corner vertical column units are connected longitudinally by truss frames as well as bottom beams and all together with other structural members comprise a three-dimensional rectangular gantry frame. Each corner of the frame is provided with a trolley unit having flanged crane-type wheels that travel on rails placed on opposite sides of the track and location. The trolleys on both corners of one end of the frame are provided with a chain drive operated by a hydraulic motor driven hydraulically from a central hydraulic pump operated by a diesel engine mounted on the main gantry frame. The top horizontal beams on the frame have rails on the respective upper surfaces thereof on which is mounted partial, circular rails having mounted thereon a rotating trolley which carries on the top thereof on opposite ends partial, longitudinal rails supporting two respective length adjustment trolleys having a link adjustment means connected thereto and driven hydraulically to position the vertical lifting grappling arm assemblies which are supported by hydraulic cylinders and piston rod members which drive opposed telescopic grappling arms to engage a trailer and to lift same for movement to a different location. The hoisting cylinders for the grappling arms are connected at their other end by universal joints which are then connected to the length adjustment trolleys. The length adjustment trolleys, the rotating frame, and the traversing trolley support and position the trailer. Two hydraulic cylinder and an equalizer means position the length adjustment trolleys and maintain them equidistant from the center. The rotating trolley is positioned by two hydraulic cylinders. A telescopic grappling arm assembly connects to the rods of the hoisting cylinders by universal joints and adjusts horizontally for varying load widths and load engagement. Vertical telescopic joints on the grappling arm assembly provide additional ground clearance. A hydraulic system provides power for the crane travel and load handling and this and a pneumatic brake system are all controlled by an operator in a cab on one corner of the main frame. An electrical system includes the engine driven alternator, circuit breakers, a cab heater and an immersion heater in the hydraulic reservoir, and such other equipment as flood lights. Other important details of construction will appear more fully in the detailed description hereof.

A primary object of this invention is to provide a gantry crane which is readily positionable and adjustable for moving a heavy load such as a trailer from one location to another.

Another object of this invention resides in the arrangement of a transverse trolley for transverse movement, a rotating trolley frame for rotational adjustment, and an equalizer arrangement for the load engaging means which actually holds the load during movement.

Still another object of this invention resides in the arvision of a gantry crane using hydraulic means for the power that is required both for the crane travel and for the load handling.

Still another object of this invention resides in the arrangement of spaced equalizer trolleys hydraulically arranged to adjust the length of the load engaging means.

An additional object of this invention resides in the construction and arrangement of the load engagement means comprising both horizontal and vertical adjustment of the load engagement arms and hydraulic cylinder operation with universal connection.

Still another advantage of the present invention resides in the brake arrangement on the wheeled frame which supports and drives the gantry on the track.

Also an advantage of this invention resides in the bushing means and adjustment for the sliding members on the grappling device.

Another feature of this invention is in the grappling arrangement.

An additional feature is found in the brake arrangement on the trucks.

A further advantage is found in the safety arrangement for preventing operation at the wrong time and/or wrong place.

Other and further objects and advantages of our invention will become apparent upon reading the following specification taken in conjunction with the accompanying drawings, in which:

FIG. 2 is a front elevation view of the gantry crane shown in FIG. 1 with the load engaging arm detached for illustration in one position.

FIG. 3 is a top plan view of the gantry crane shown in FIG. 1 with a portion of the operator's cab removed.

FIG. 4 is an elevation view of the rotatable frame with the hydraulic cylinders attached.

FIG. 4A is an elevation view of the other side.

FIG. 6 is a plan view of the grappling arm shoe less the removable pad.

FIG. 7 is a side elevation view of the grappling arm shoe with removable pad.

FIG. 8 is a front elevation view of the grappling arm shoe.

FIG. 9 is a front elevation view of the grappling arm crane assembly.

FIG. 10 is a side elevation view of the grappling arm shown in FIG. 9.

FIG. 11 is an enlarged detailed plan view of the rotation interlock cam.

FIG. 12 is a side elevation view in enlarged detail of the rotation interlock assembly.

FIG. 13 is a front elevation of the rotation interlock assembly shown in FIG. 12.

FIG. 14 is a cross-section view along line 14—14 in FIG. 9.

FIG. 16 is a side elevation view of the interlock assembly.

FIG. 17 is a front elevation view of the traverse interlock assembly shown in FIG. 16.

FIG. 22 is a top plan view of the powered truck.

FIG. 23 is a side elevation view of the truck in FIG. 22.

FIG. 24 is a top plan view of the non-powered truck.

FIG. 25 is a side elevation view of the truck in FIG. 24.

Figure 1:
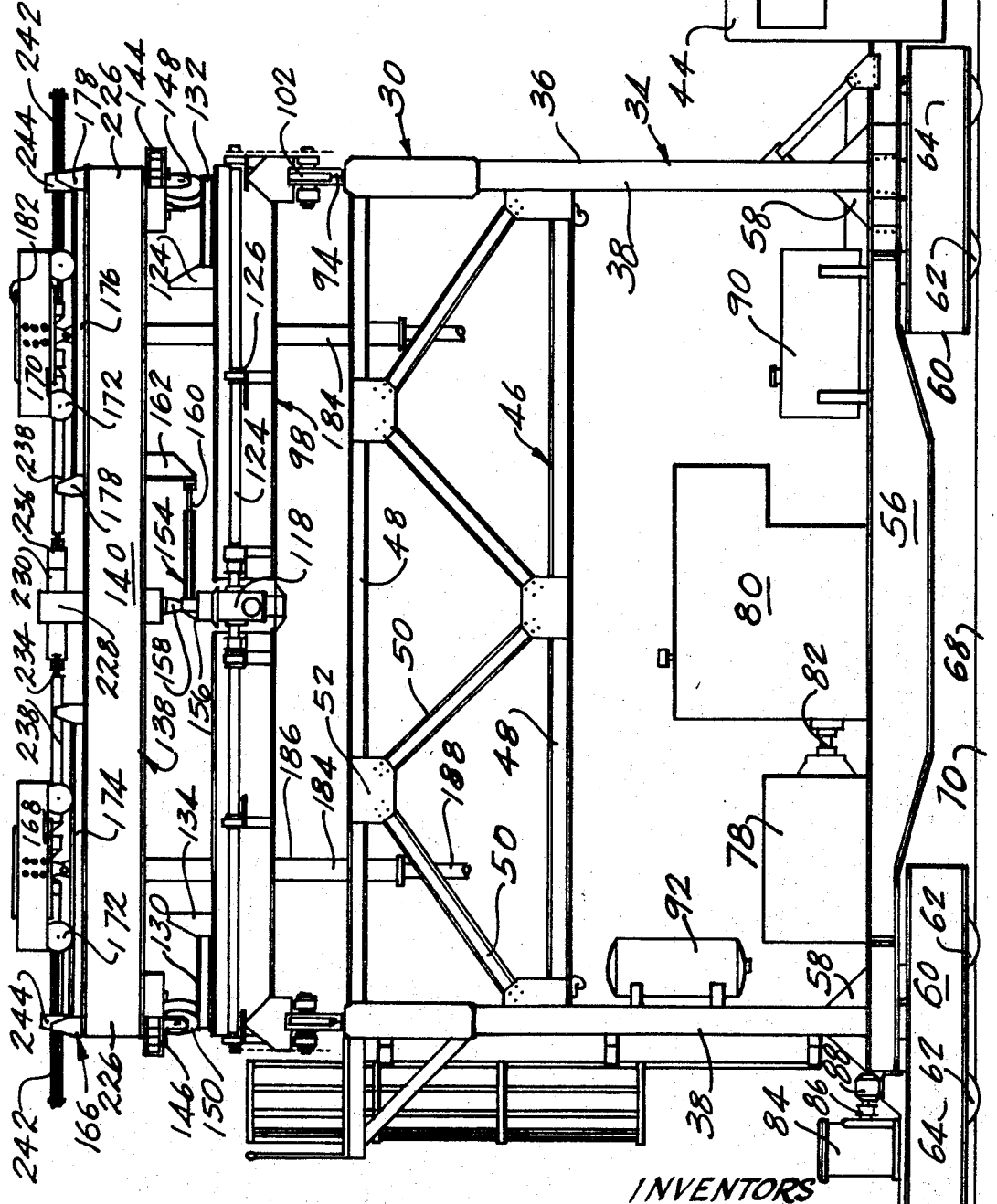
FIG. 1 is a side elevation view of the present gantry crane invention.
Figure 5:
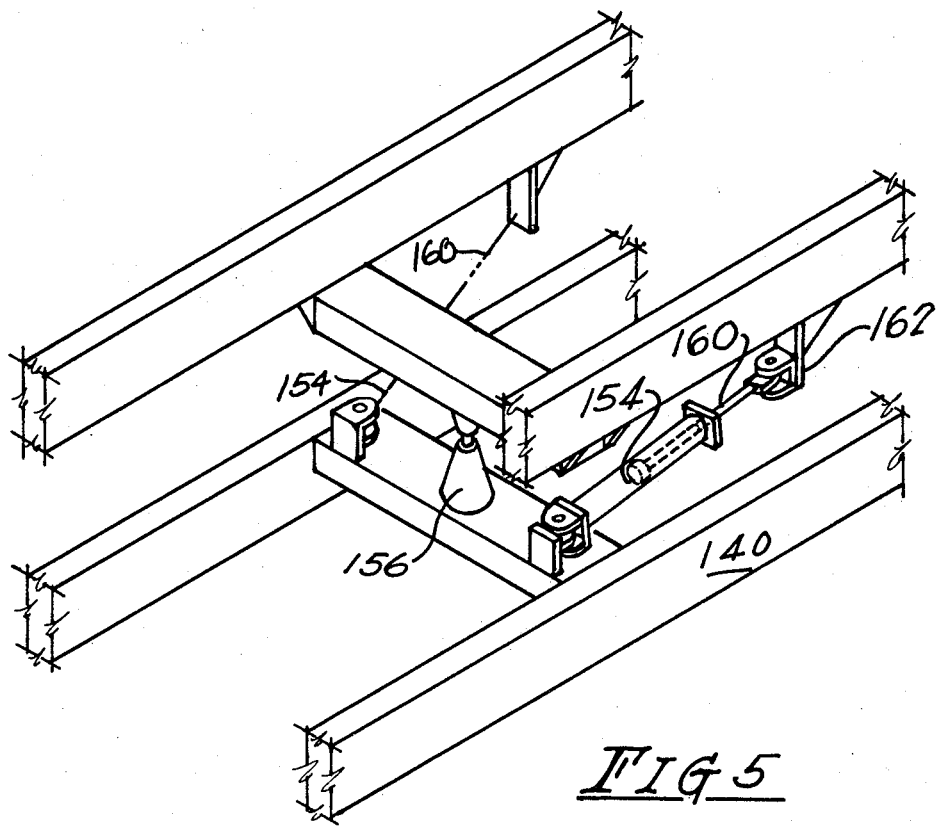
FIG. 5 is a perspective view of the rotatable trolley and drive means therefor with parts broken away.

Referring initially to FIGS. 1 through 3, inclusive, of the present gantry crane for a general and overall description of the structure, and then as the specification unfolds to other figures of the drawings, the gantry is designated generally in overall reference numeral 30 and, as described in the introduction to this specification, it is a large, heavy and extremely strong structure of something in the order of 38 feet of inside clear width with rail centers of approximately 42 feet and an overall width of approximately 45 feet. The overall height and one embodiment is something in the order of 42 feet with a wheel base of 30 feet and may be rated in lifting capacity at something safely of upwards of 100,000 pounds. The hoist speed is something like 34 feet per minute with a light load and 17 feet per minute with a rated capacity load. Its traverse speed is something like 90 feet per minute. The travel or longitudinal speed of the gantry when lightly loaded is about 5 miles per hour. The travel or longitudinal speed of the gantry with a rated capacity load is about 3 miles per hour. As will appear hereafter sufficient powers provided through the diesel engine by mover and hydraulic drive to permit simultaneous operation hoist, traverse and horizontal travel of the crane under rated capacity load (e.g. 50-ton) conditions. The crane has interlock protection to prevent retraction of grappling arms at a time of traversing trolley operation or when carrying a load and the crane in one embodiment is capable of picking up or placing 20 foot to 40 foot trailers in a row at an angle of approximately 15 degrees right or left parallel to the track on which the train is operated. The crane operates on 140 pound design rail with the capability of negotiating under a full load or empty and one embodiment at rated speed curves of up to 5 degrees.

It is to be understood that the structural design of the crane, which refers to the strength of the frame and supporting members, is a matter of structural design and reference is made to applicable sections of the A.I.S.E. specifications for Electrical Overhead Traveling Crane for steel mill service. This is a matter of steel structural design providing sufficient size and strength of members with adequate safety factors.

Gantry 30 comprises a primary or basic or main overhead frame designated generally as 32 and comprising vertical, corners supporting structural members 34 each constructed as a corner post assembly and comprising beams 36 and metal plate 38. A heavy, horizontal front and rear transverse beam support member 40 is attached to, as by welding and bolting, respective corner assemblies 34 and suitably secured in place by metal plate and box attachment 42 at each corner. For sake of convenience, one end of the gantry which has an operator's cab 44 thereon is designated and referred to as the front and the opposite end is referred to sometimes herein as the rear.

The respective front and rear horizontal beams 40 on respective sides of the gantry 34 are connected together by means of a truss designated generally by numeral 46 and comprising horizontal truss members 48 opposed to one another vertically and connected by diagonal beam truss members 50 suitably bolted and/or welded by connecting plates 52 along the spaced, opposed members 48, together providing a structurally sound and safe truss.

The front and rear of the gantry 30 across transversely are completely open and the respective corner members 38 at the front and rear are connected at the bottom by a longitudinal bottom beam 56 attached at the bottom of each corner 38 by welding and/or bolting together with suitable reinforcement plates 58 placed in accordance with sound structural design.

Each corner at the bottom of each corner post 38 has a trolley designated generally by reference numeral 60 and each trolley is an independent wheeled frame supported on flanged type crane wheels 62, there being two such wheels in line on each trolley. Trolleys 60 are constructed from heavy beams on which are mounted wheel shafts 64 supporting wheels 62. Each beam 66 is attached to the bottom horizontal beam 56 and to the respective corner assembly 38. Railroad rails 68 are suitably attached to the ground 70 and extend longitudinally along and parallel to the conventional usual railroad racks over which the entire gantry 30 operates for the purpose of lifting trailers from railroad cars and placing them in another location within the gantry or vice versa. Rails 68 support respective trolleys 60 on the wheels 62 and the entire gantry 30 moves on trolleys 60 at each corner thereof along the respective rail 68.

The trolleys 60, sometimes called trucks, on the rear of the gantry, there being two, one on each side, are power driven whereas the other two trucks or trolleys 60 on the front of the gantry are not power driven and therefore move only in response to the power from the two trolleys 60 on the other end. Both front and rear trucks 60 have brake units described later. A diesel engine 78 drives a hydraulic power pumping unit 80 through a diesel engine 78 drive shaft 82 and which hydraulic power unit 80 is connected by hydraulic lines with a hydraulic motor 84 mounted on the respective rear trolleys or tracks 60. Each motor 84 has an output shaft of 86 which drives a power transmission unit 88 connected to the drive wheel 62 on trolley 60 on that corner. This provides the power movement of the gantry 30 in response to operator control in cab 44 to control the hydraulic operation. Fuel for diesel engines 78 is supplied by a fuel tank 90. An air tank or receiver 92 is mounted on one of the corner frame members 38 for supplying pneumatic brakes and for any other required air supply. The tank receives compressed air from a diesel engine 78 air compressor.

Mounted across the upper surface of horizontal beams 40 is a track 94 extending substantially the entire length thereof and having stops 96 on each end and on both tracks 94 at the front and rear of the gantry 30 is mounted a transverse or laterally movable trolley or support frame designated generally in assembly as 98 and being constructed from beams 100 arranged in a substantially rectangular structural frame and having trolley wheels 102 mounted on shafts 104 on wheel supports 106 at each corner of the trolley 98. One of the wheels 102 on each of the two corners is power driven by means of a sprocket 110 driven by a chain 112 from another sprocket 114 driven by a long transverse drive shaft 124 supported at spaced intervals on bearings 126 operated from a transmission unit 118 and a hydraulic motor 116 through a coupling 20. Thus, the entire trolley 98 is selectively operable by the operator in cab 44 to drive the gantry 30 transversely across the top rails 94 on horizontal beams 40. This provides the main transverse movement on the gantry 30.

Supported at the front and read ends on the top of trolley frame 98 are respective partial and circular rails 130, 132 having respective stop members 134 on each end thereof. Each of the rails 130, 132 supports a rotating trolley 138 having wheel supports 144, 146 at each of respective front and rear corners thereof and supporting track wheels 148, 150. The entire rotating frame trolley 138 is rotated in one direction or the other by means of a pair of hydraulic cylinder and piston assemblies 154 having side beams 140 and 40, and a cylinder with one end pivotally mounted on a central support pivot beam 156 comprising a journal bearing member 158 and the piston rod 160 attached to frame 138 at a depending plate member 162. Thus, with the cylinder 154 attached to the frame 98 and the piston 160 attached to the movable and rotating trolley frame 138, action of the piston 160 in one direction or the other rotates the entire rotatable trolley frame 138 accordingly.

The top of the rotatable trolley 138 supports the length adjustment trolleys and hoisting cylinder arrangement designated generally by reference numeral 166 and comprising longitudinally movable length adjustment trolleys 168, at the front and 170 at the rear which extends transversely across the frame 138 in the manner seen in FIG. 3 and each trolley 168, 170 is supported on trolley wheels 172 which ride on respective longitudinal rails 174, 176 having respective front and rear stop members 178. Each of the trolleys 168, 170 is constructed from an elongated beam member 180 having web plates 182 at each end thereof over the wheels 172 at that location and each plate 182 supports a respective hoisting cylinder arrangement 184 comprising a hydraulic cylinder 186 having an elongated piston rod 188 therein. The upper end of the cylinders 184 each is supported in a universal connection comprising a female clevis 190 supporting a male clevis member 192 and attached by means of a clevis pin 194. The end of the cylinder 186 is pivotally mounted by sleeve 195 to be both rotatable and swingable about the pin 194.

Referring to FIG. 2, each of the piston rods 188 there being two at the front and two at the rear, attaches inside of a respective angular corner and tubular L-shaped member 196 forming part of an overall grappling assembly 198 constituting the grappling arm arrangement for lifting beneath a trailer. Each L-shaped tubular member 196 comprises a horizontal portion 200 in which is slidably or telescopically mounted a sliding beam 202 connected to the other L-shaped member on that respective front or rear frame actuated by a cylinder arrangement 203. In addition, each vertical leg 204 of a respective L-shaped corner member 196 supports a slidable or telescopically and vertically movable leg 206 each having a bottom grappling shoe 208 thereon having an inwardly projecting grappling memer 210. Each of the grappling assemblies, there being one at the front and one at the rear, is supported on a pair of spaced assemblies 212 including cylinders 184 connected to the horizontal portion 200 of each of the corner members 196 by means of a connecting pin 214. With this arrangement, the grappling assemblies 198 at the front and rear may be selectively raised by controlling the length of the rod 188 and may be swung transversely by the transverse trolley 98 and at the same time, if desired, may be adjusted upwardly or downwardly by rods 188 and also telescopically adjusted through the movement of the respective telescopic portions 200, 202. Legs 206 slide against phenolic bearing plates 215 and are adjusted by threaded bronze set screws 217. Bearing plates 219 on member 200 bear against member 202. Looking at FIGURE 2, with a typical trailer 220 sitting in one position it is possible to lift and move this trailer by driving the trolley frame 98 across above the trailer with the grappling arms 206 retracted above the position shown on the right hand of FIG. 2 and then the front and rear grappling assemblies 198 are lowered over the trailer 220 with the arms 206 swung outwardly through the relative movement of the telescopic portions 200, 202 and then brought downwardly along the sides 222 of the trailer 220 until the grappling shoes 208 are beneath the bottom corners of the trailer 220 and the grappling shoe member 210 is under the corner at which time the grappling legs 206 are pulled inwardly tightly by means of the members 212. There is a stop member 223 inside member 204. Any necessary rotationable adjustments is easily accomplished by moving the trolley 138 by means of the cylinder arrangement 154 thereby to properly align the grappling frames 138 as they are brought into position about the trailer 220. Likewise, as the trailer is lifted from its position on the left hand side of FIG. 2 to a raised position shown on the right hand side of FIG. 2, the operator in the control cab 44 through the use of hydraulic control members can maintain the proper alignment both transversely through the transverse trolley 98 and the rotational alignment through the movement of the rotatably movable trolley 138.

In addition, as will now be described there is an equalizer arrangement using the length adjustment trolleys 168, 170, and references now made to FIGURES 1 and 3. The transverse frame members of the rotational trolley 138 together with the longitudinal members 140 make up the frame on which the length adjustment trolleys 168, 170 operate across respective tracks 174, 176. A central transverse frame member 228 mounted on the rotational trolley 138 has an equalizer bar member 230 pivotally attached thereto by pivot pin 232. Each end of the equalizer bar 230 has pivotally attached thereto at respective positions 234, 236 front end of draglink 238 which has the other end thereof connected to a piston rod 240 in a cylinder 242 pivotally connected at 244 to the transverse member 226 on each side. One end of each of the respective draglinks 238 opposite from the positions 234, 236 is attached to the main frame member of the respective equalizer trolleys 168, 170. Thus, when for example, a cylinder 242 on one side is actuated hydraulically to drive the respective piston rod 240 on that side, and this action pushes the respective trolley, for example, trolly 168 to drive same across its respective track 172 in a longitudinal direction, this action pushes through the respective draglinks 238 against the equalizer bar 230 which equally pivots about pivot point 232 against the other draglinks 238 connected to the other trolley 170 to maintain the two trolleys 168, 170 equi-distant from the center 232.

Rotation interlock assembly

Figure 15:
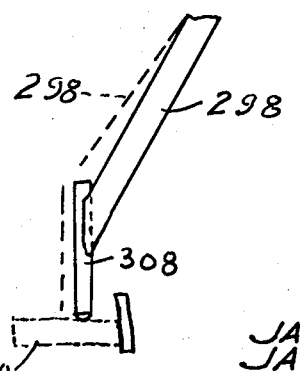
FIG. 15 is an elevation view of a detail.
Figure 18:
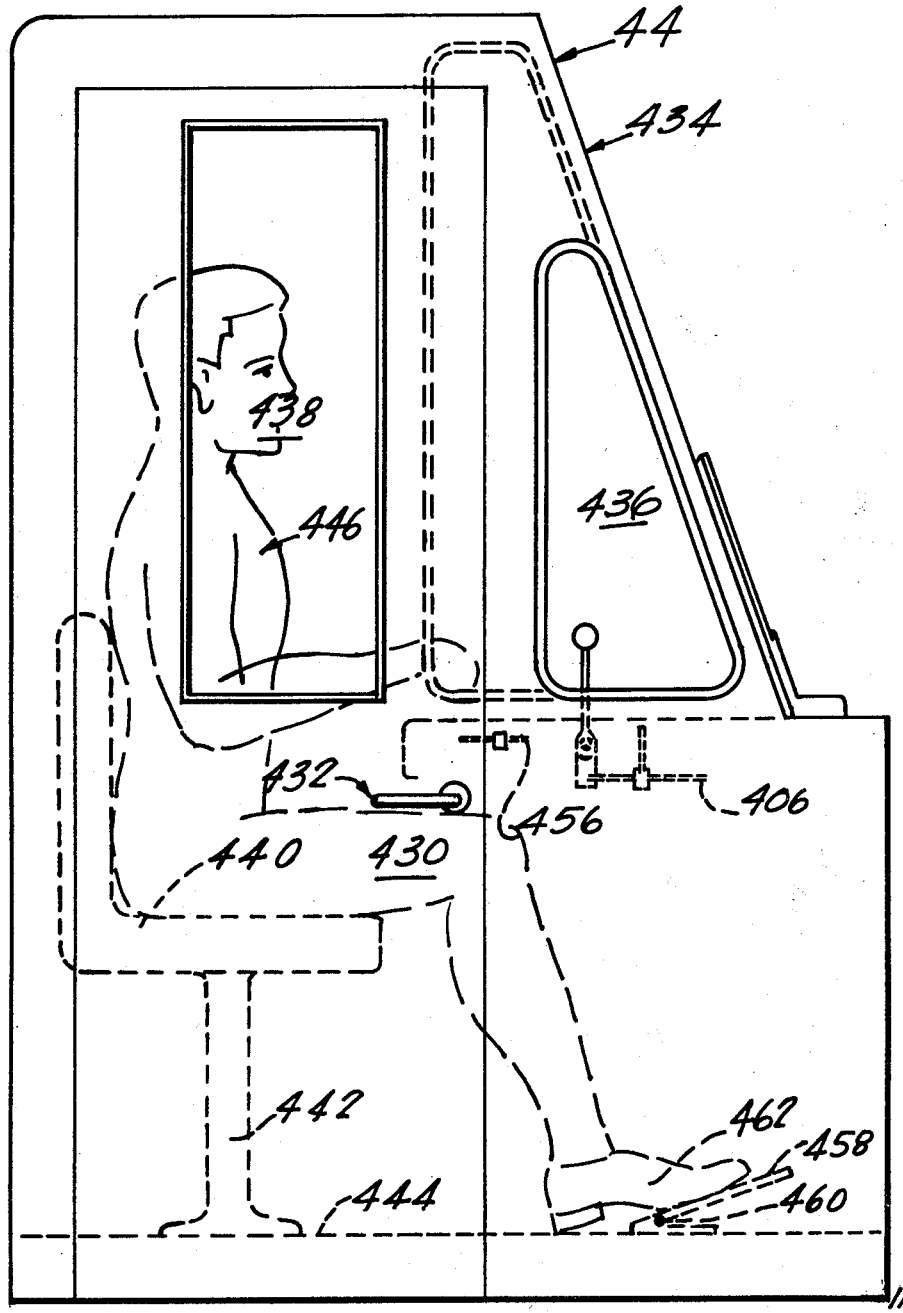
FIG. 18 is a side elevation view of the operator's cab.
Figure 19:
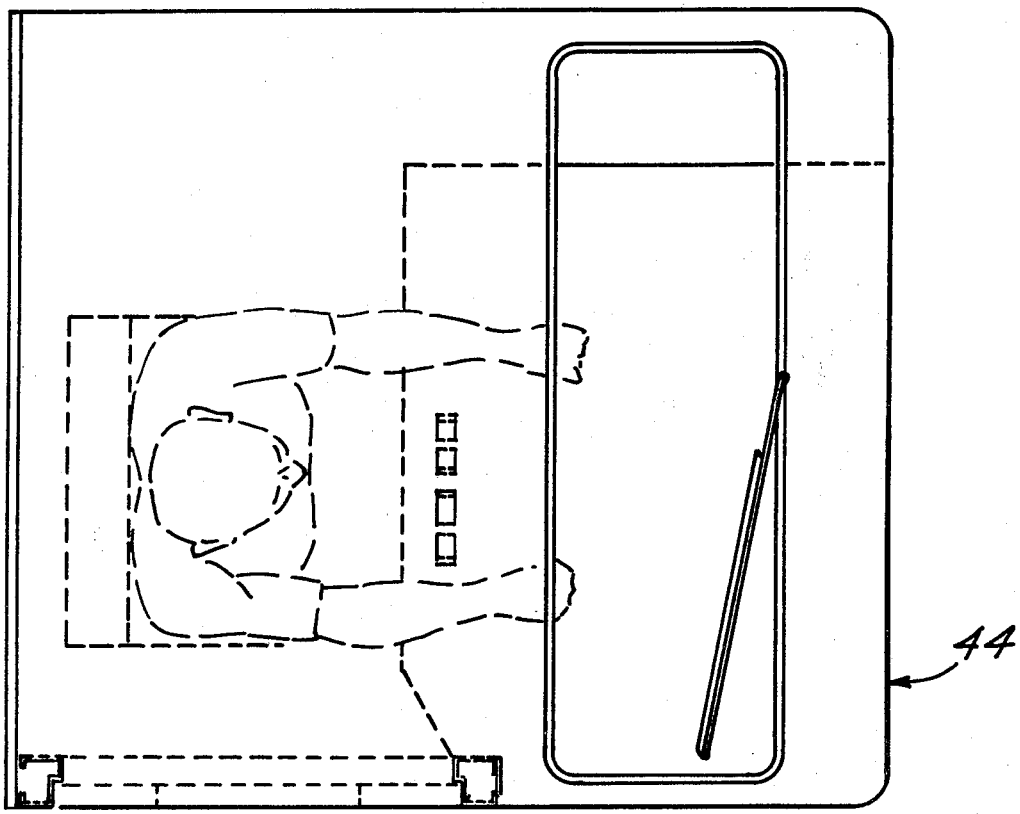
FIG. 19 is a top plan view of the operator's cab shown in FIG. 18.
Figure 20:
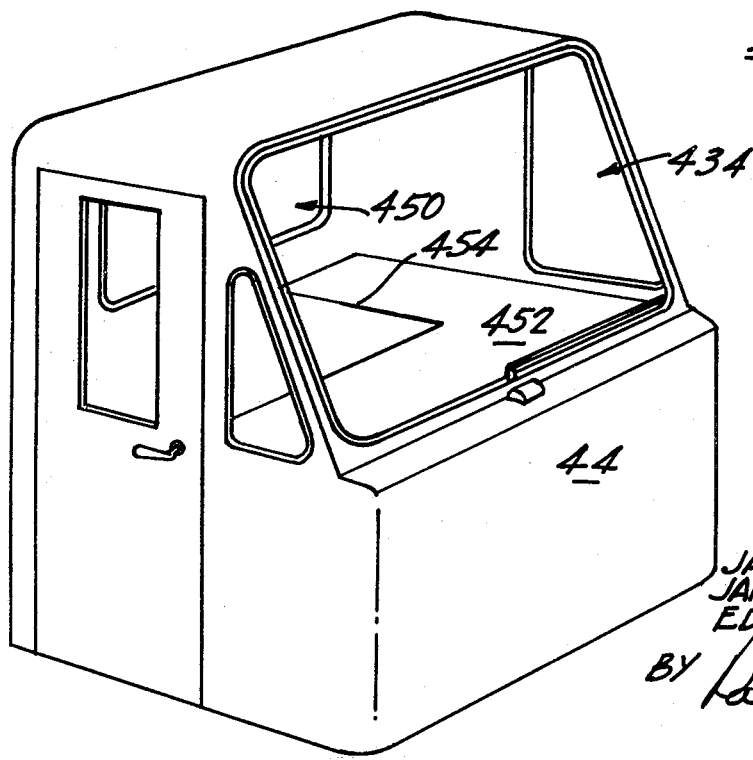
FIG. 20 is a perspective view of the operator's cab shown in FIG. 19.
Figure 21:
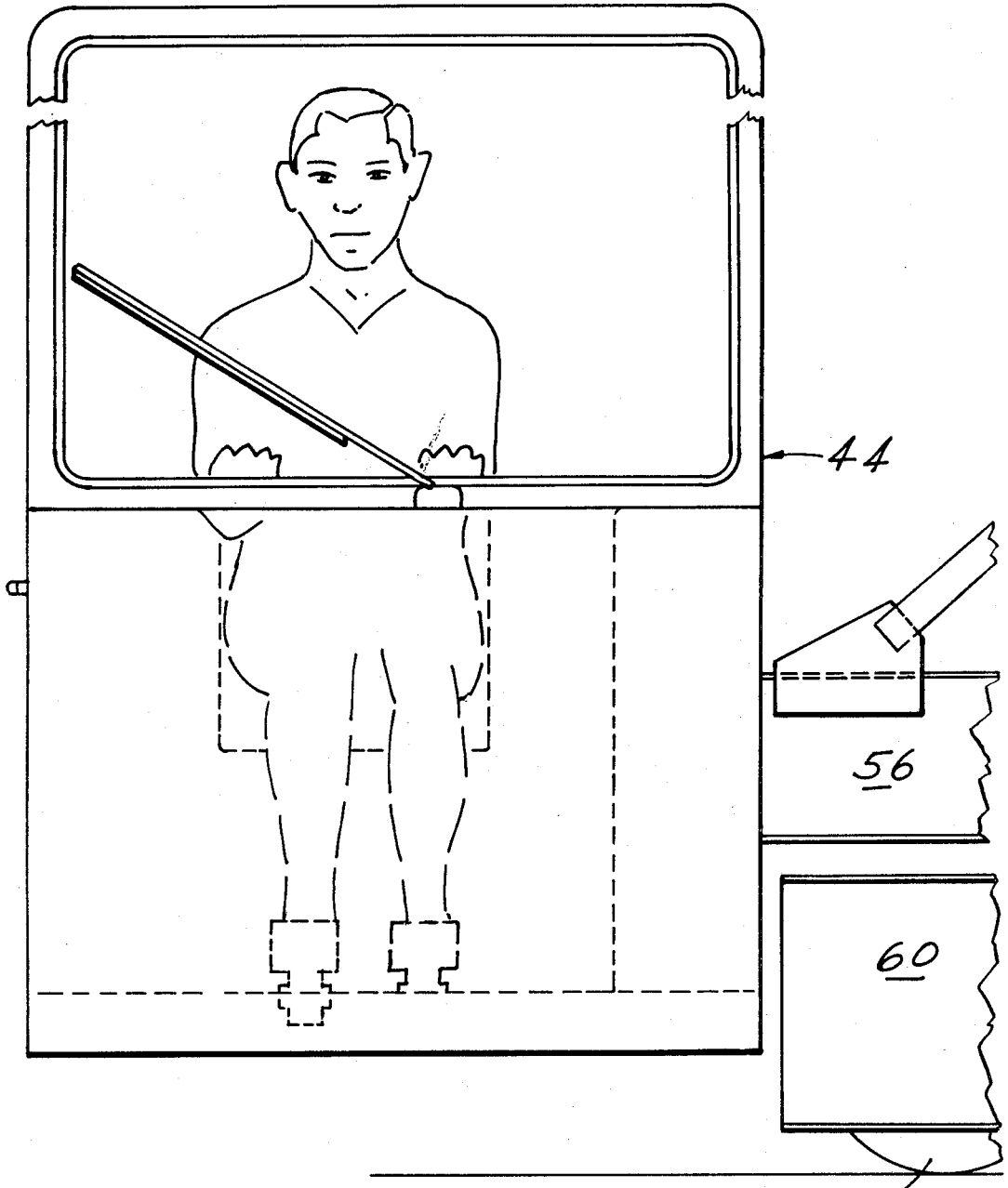
FIG. 21 is a front elevation view of the operator's cab shown in FIG. 20.

The "interlock assembly" shown in FIGS. 13 through 15, inclusive, is an arrangement to discontinue power operation of the rotation trolley 138 as an added safety factor to prevent excessive rotation in an area where the load could contact the gantry frame trolley 138. The valve mounting plate 256 has a pair of spaced pillow block assemblies 258 mounted thereon and supporting a shaft 260 thereon. Shaft 260 has an actuator arm member 262 attached thereto and supporting a caster wheel 264 by means of a bifurcated connection bracket 266. A pair of valve support plate members 270 support respective shut-off valves 272 thereon. Each shut-off valve 272 has a valve actuating member 274 operably connected thereto and adapted upon reaching certain limits to be actuated by an actuator 276 mounted on actuator arm 262.

The traverse trolley 98 supports a bar member 278 reinforced by suitable gusset plates 280 and having a flat cam plate 282 attached to the bar member 278. The cam member is shown in plan view in FIG. 13 and is made from a metal plate having a particular cam track 284 with a cam drop-off portion 286 therein calculated and pre-determined to cause actuation of the respective valve actuating member 276 upon reaching the set limits which in one embodiment is 3 to 4 degrees from center either way.

In the operation of the device, the caster 264 rides in the normal track portions of the cam 284 until the respective rotation trolley 168 or 170 reaches the limit of the respective stops 178, at which time the caster wheel drops into the portion 286 which causes the actuator arm 262 to move from its normal position substantially between the actuating members 274 of the respective shut-off valves 272 which causes the respective shut-off valve 272 to be operated thereby shutting off the flow of hydraulic power to the cylinder arrangement 154 which operates the rotation trolley 138.

*Traverse interlock*

In FIGS. 16 and 17 there is shown the traverse interlock assembly which prevents the traverse trolley 98 from exceeding safe travel limits. The complete traverse interlock assembly is designated generally by reference numeral 290 and comprises a traverse interlock support plate member 292 supporting a pair of journal bearing assemblies 294 having a shaft 296 mounted therein. Shaft 296 supports a pair of converging arms 298 having respective actuating members 300 thereon each having an adjustable threaded portion for adjustment with respect to the respective arm 298. A plate member 302 supporting on opposite sides thereof a respective shutoff valve 304 having a shutoff cam roller actuator 306 which at certain times is contacted by the actuating members 300. The converging ends of the members 298 receives attached thereto the shaft 308 of a wheel 310 held in place by washers 312 and cotter pin 314.

In the operation of the traverse interlock assembly, the assembly support plate 292 travels with the traverse trolley 98 in either direction of movement and normally the hydraulic fluid for driving the wheel 102 is supplied without being interrupted by the shutoff valve 304. However, when the wheel 310 of the shutoff traverse interlock assembly 290 reaches its critical position (i.e. train zone) on the gantry track 94 at the stops 96, then the respective shutoff valve 304 is actuated by the actuator 300 contacting a cam plate 311 when the wheel 310 reaches resistance to move the entire assembly 290 on the shaft 296 which shuts off the respective valve 304, stopping rotation in that zone or stopping the trolley from entering the zone of rotation has occurred.

*Grappling assembly 196*

Referring to the grappling arm frame assembly 198, as shown in FIGS. 1, 2, 9, 10 and 14, and then to the details of the grappling shoe shown in FIGS. 6, 7, and 8 inclusive, assembly 196 will now be described. The grappling arm assembly 196 has grappling arm lift cylinders 212 which are connected by means of a lifting cylinder yoke 350 to a lifting cylinder pivot pin 351 having a cylinder attachment 352 and a pivot pin grease fitting 354 with a lifting cylinder yoke pin 356.

Members 202 are restracted or extended in members 200 by means of a clamping cylinder clevis pin 358 having a clamping cylinder clevis pin 360 and a clamping cylinder yoke 362. The inner inside end of member 202 has attached thereto a trunnion 364 supported on phenolic trunnion bearing pads 366 sliding inside tube member 200. Adjustment screw 368 adjusts the trunnion bearing pads 366. Other adjustment bronze pins 370 adjust the sliding of trunnion 364. A clamp cylinder trunnion retainer 372 attaches a hydraulic cylinder 374 inside of member 202 and connects it to trunnion 364. A piston rod 376 operated by cylinder 374 is connected to the yoke 362. Hydraulic actuation in cylinder 374 selectively either pulls tube 202 inside of tube member 200 to bring the grappling arms 206 closer together or further apart as desired in order to adjust the grappling apparatus along the sides of the load.

Cylinders 188 are attached in their upward position to the respective equalizing trolleys 168, 170 by means of the universal connections 190, 192 and 194 as shown in FIG. 2.

Each cylinder 188 has a cylinder rod 380 connected to a retracting cylinder yoke 382 which in turn is connected to a retracting tube support frame 384 connected to a shoe pin 386 attaching the shoe 208 in place on the frame member 206. In side members 206 which are actuated by in travel with the end of the rod 380 and the yoke 382 slide inside of the outer grappling frame member 204 on adjustable bearing pad members 390 and adjustable bronze bearing 392 operates between th emembers 204, and 206. Actuation of a hydraulic cylinder 188 either retracts rod 380 and lifts the shoe 208 inside the outer tube member 204 or vice-versa extends rod 380 and extends shoe 208 inside tube member 204 to extend the shoe 208 downwardly. This action is used for positioning the shoes 208 beneath the load prior to lifting the entire grappling 196 through the hydraulic lifting cylinders 212.

Each lifting shoe 208 comprises vertical bearing plates 398 having openings 400 therein in which the pins 386 on inner tube members 206 are mounted and there is a front bearing plate 398 and a rear bearing plate 398 each having an opening 400 therein. A foot plate 402 is connected to the member 210 which has the upstanding lug thereon. A reinforcement plate 404 is mounted in openings 406. Each shoe 208 has removable and replaceable wear pads 408 held in place by bolts 40 so that the pads 408, which are metal plate, may be removed and replaced. Shoes 208 have two positions: up or down.

*Operator's cab 44*

As mentioned previously, the operator's cab 44 is located on one end of the gantry at one corner thereof as shown in FIGS. 1 and 2 and the front of the cab as seen in FIG. 2 faces inwardly so that the operator observes the handling of the load 220 and the positioning of the grappling apparatus 196. Cab 44 is a normally closed structure with a door 430 through which the operator enters by operating handle and latch 432. The front of the cab has a slanted window 434 with smaller side windows 436 and other side windows 438 one of which is in door 430. As seen in FIGS. 18 through 21, inclusive, the operator sits on a swivel stool 440 mounted on a post 442 on the floor 444 of the cab 44 and the operator is designated generally by reference numeral 446 actuating control members with each of his hands 448. It is to be noted that the window 434 is a large picture window with heavy protective glass and a heavy rim so that the operator is able to safely observe the moving and positioning and relocation of the load 220. As seen in the enlarged view of FIG. 21, the cab is attached as by welding or bolted to one of the horizontal frame members 56 at that corner and is near the trolley 60 at that position.

The cab 44 is made from heavy metal much like the cab on a large truck or the like and has a rear window 450 for observing operations in that direction.

A shelf like arrangement 452 has stick control members 454 mounted thereon which are attached by lengths 456 to operate hydraulic valves controlling the operation of all of the hydraulic system of the present gantry. In addition, foot pedals 458 pivotally mounted at 460 may be operated selectively by the operator's foot 462 to control other functions of the gantry, namely gantry travel and pneumatic brakes.

The braking of the gantry is by means of the pneumatic brake control arrangement 500 shown in FIGS. 22 through 25, in connection with the respective driven and nondriven trucks 60. Each of the wheels 62 on one end of each truck 60 has a brake shoe 508 movably mounted therewith by means of a brake shoe arm 510 controlled by a lever 512 from the pneumatic brake control 500 which includes a pneumatic cylinder arrangement 514 with actuator 516 which, in selective response to the operator's valve control, applies the respective brake shoes 508 to the respective wheel 62. Truck 60 includes a connecting pin 600 and is covered by a housing or shroud 602 made of metal or the like and shaped to cover the parts of the trucks 60.

While we have shown and described a particular embodiment of the gantry and various parts thereof, this is by way of illustration only and does not constitute the only form of the invention, since various alterations, changes, substitutions, revisions, omissions, deviations, combining, and departures may be made in the form shown and described herein without departing from the scope of our invention as defined in the appended claims.

We claim:

1. In a gantry crane:
   (a) a gantry frame having vertical members and transversely spaced side members and horizontal, transverse members rigidly connected together forming a gantry frame open and the front and rear,
   (b) a trolley mounted on each corner of the frame and having trolley wheels thereon, said wheels being shaped to fit a track comprising conventional rails spaced apart,
   (c) a hydraulic motor on said gantry connected with at least one of said trolleys to drive same selectively,
   (d) transverse rails mounted on said gantry on the top thereof,
   (e) a transversely movable frame mounted on said rails on said gantry for transverse movement thereacross,
   (f) circular rails mounted on opposite sides of said transversely movable frame,
   (g) a circularly movable rotation frame mounted on said circular rails for rotation thereon,
   (h) means for driving said transversely movable frame and other means for driving said rotation frame,
   (i) a lifting frame supported on a transverse frame and said rotation frame and including lifting arms depending therefrom, there being spaced, opposed lifting arms connected together on opposite sides and spaced apart to fit about a load such as a trailer.

2. The device in claim 1:
   (j) means connecting said lifting arms transversely across the gantry, said means including relatively movable members connected together transversely, said lifting arms being connected to said relatively movable members on opposite sides,
   (k) movable support means spaced across and mounted on top of said rotation means and having a respective lifting arm on that side connected thereto for movement therewith, 3. The device in claim 1:
   (l) hydraulically controlled power means connected to said lifting arms for driving same closer together or apart transversely of said gantry,
   (m) hydraulically controlled power means on said lifting arms and said rotation frame for driving said lifting arms vertically to raise or lower said arms and said load therein.

4. The device in claim 2, wherein there is an equalizing means connected to and between said movable support means in (k) for equalizing the movement therebetween and between the lifting arms supported thereon.

5. In an equalizing means for a gantry crane, which crane has a rotation frame and lifting arms operated by hydraulic power means comprising a first and a second movable frame mounted on the top of said rotation frame and movable transversely thereon, each of said first and second frames being connected to the lifting arms on that side, hydraulic power means operable to move each of the first and second frames, and a pivoted connecting member pivotally connected to the gantry frame and to a respective first and second frame at each end.

6. In a gantry crane:
   (a) a gantry frame having vertical members and transversely spaced slide members and horizontal, transverse members rigidly connected together forming a gantry frame open and the front and rear,
   (b) a trolley mounted on each corner of the frame and having trolley wheels thereon, said wheels being shaped to fit a track comprising conventional rails spaced apart,
   (c) a hydraulic motor on said gantry connected with at least one of said trolleys to drive same selectively,
   (d) transverse rails mounted on said gantry on the top thereof,
   (e) a transversely movable frame mounted on said rails on said gantry for transverse movement thereacross,
   (f) circular rails mounted on opposite sides of said transversely movable frame,
   (g) a circularly movable rotation frame mounted on said circular rails for rotation thereon,
   (h) means for driving said transversely movable frame and other means for driving said rotation frame,
   (i) a lifting frame supported on a transverse frame and said rotation frame and including lifting arms depending therefrom, there being spaced, opposed lifting arms connected together on opposite sides and spaced apart to fit about a load such as a trailer,
   (j) means connecting said lifting arms transversely across the gantry, said means including relatively movable members connected together transversely, said lifting arms being connected to said relatively movable members on opposite sides.

7. In an equalizing means for a gantry crane, which crane has a rotation frame and lifting arms operated by hydraulic power means, comprising a first and a second movable frame mounted on the top of said rotation frame and movable transversely thereon, each of said first and second frames being connected to the lifting arms on that side, an equalizing member supported intermediate its length and attached to a respective frame for movement therewith, and hydraulic power means connected to each of the first and second movable frames, 8. In an equalizing means for a gantry crane, which crane has a rotation frame and lifting arms operated by hydraulic power means comprising a first and a second movable frame mounted on the top of said rotation frame and movable transversely thereon, each of said first and second frames being connected to the lifting arms on that side, and hydraulic power means including a pair of hydraulic cylinders each connected to a respective frame and operable to move each of the first and second frames, one in response to the movement of the other.

9. In a gantry crane:
   (a) an overhead gantry frame of generally rectangular construction and comprising vertical corner structural column units,
   (b) front and rear supported and transverse horizontal beams extending overhead,
   (c) truss units connecting said vertical column,
   (d) a trolley unit for each corner of the gantry frame and each having flanged wheels thereon for traveling on rails, (e) a drive means on each of the corners on one end of said frame comprising a hydraulic motor on the trolley driving a trolley wheel,
(f) hydraulic central pump means for supplying hydraulic pressure to operate said trolley drive,
(g) a power means for operating said hydraulic pump means,
(h) a rectangular traversing trolley on the top beams of said gantry frame,
(i) arcuate, partial rails mounted on the top of said traversing trolley,
(j) a rotation trolley mounted on said arcuate rails,
(k) longitudinal rails on top of said rotating trolley,
(l) a pair of link adjustment trolleys on said longitudinal rails and having a link adjustment means connected thereto,
(m) hydraulic drive means for positioning the link adjustment means.

10. In a gantry crane:
(a) an overhead gantry frame of generally rectangular construction and comprising vertical corner structural column units,
(b) front and rear supported and transverse horizontal beams extending overhead,
(c) truss units connecting said vertical column,
(d) a trolley unit for each corner of the gantry frame and each having flanged wheels thereon for traveling on rails,
(e) a drive means on each of the corners on one end of said frame comprising a hydraulic motor on the trolley driving a trolley wheel,
(f) hydraulic central pump means for supplying hydraulic pressure to operate said trolley drive,
(g) a power means for operating said hydraulic pump means,
(h) a rectangular traversing trolley on the top beams of said gantry frame,
(i) arcuate, partial rails mounted on the top of said traversing trolley,
(j) a rotation trolley mounted on said arcuate rails,
(k) longitudinal rails on top of said rotating trolley,
(l) a pair of link adjustment trolleys on said longitudinal rails and having a link adjustment means connected thereto,
(m) hydraulic drive means for positioning the link adjustment means,
(n) a grappling arm assembly supported on the link adjustment trolleys respectively said gantry,
(o) a hydraulic cylinder and piston means for operating said grappling arms and including a piston rod which is connected to said grappling arm assembly,
(p) telescopic grappling arms on said grappling arm assembly operable to open and close to engage a trailer for lifting same,
(q) vertical telescopic means on the grappling arm assembly for vertical adjustment thereof.

11. In a grappling device for a gantry:
(a) spaced normally substantially vertical grappling legs, each vertical leg comprising relatively movable members for extension and retraction,
(b) a horizontal sliding connection between said vertical arms,
(c) power means for extending and retracting said horizontal connection,
(d) power means for each of said arms for extending and retracting said relatively movable members on said arms,
(e) grappling shoes on the bottom of said respective arms for engagement with a load such as a trailer,
(f) hydraulic cylinder means connecting to said grappling arm assembly for raising and lowering same,
(g) and interlock means on said gantry for preventing movement of said grappling arm assembly in an unsafe position.

12. In an interlock arrangement for a gantry crane to prevent operation in an unsafe position, a gantry frame comprising a main gantry support frame longitudinally movable,
(i) wheels supporting said support frame for longitudinal movement,
(j) a traversing frame mounted on said main frame for traverse movement thereon having a valve actuator thereon,
(k) a rotation frame on top of said traversing frame for at least partial rotation thereon,
(l) said grappling means mounted on said rotation frame and including grappling arms engageable with a load such as a trailer after a gantry frame is positioned with respect thereto,
(m) a hydraulic valve actuated by said valve actuator.

13. In a grappling device for a gantry:
(a) spaced, normally substantially vertical grappling legs, each vertical leg comprising relatively movable members for extension and retraction,
(b) a horizontal sliding connection between said vertical legs,
(c) power means for extending and retracting said horizontal connection,
(d) power means for each of said legs for extending and retracting said relatively movable members on said legs,
(e) and hydraulic cylinder means connecting to said legs for raising and lowering same.

14. In an interlock arrangement for a gantry crane to prevent operation in an unsafe position, a gantry frame comprising a main gantry support frame longitudinally movable,
(a) wheels supporting said crane for longitudinal movement,
(b) a traversing frame mounted on top of said main frame for transverse movement thereon,
(c) a rotation frame on top of said traversing frame for at least partial rotation thereon,
(d) a grappling means mounted on said rotation frame and including grappling members engageable with a load, such as a trailer, after said gantry main frame is positioned with respect thereto,
(e) interlock means including a sensing device mounted on said rotational frame,
(f) contact means contacted by said sensing means for indicating the presence in an unsafe area,
(g) and hydraulic means operated by said sensing means for preventing operation in said unsafe area,
(h) there being a cam plate in which said sensing means operates, said sensing means comprising a member movable in said cam plate,
(i) a valve operated by said members movable in said cam plate whereby said valve is contacted and actuated when said member moves into a cam plate into a certain position.

15. The device in claim 14 wherein said sensing device includes a member swingably mounted, and a wheel on said member, said cam plate having a slot confining said wheel on a particular path therein.

16. In a grappling arrangement for operation on a gantry crane, wherein, said crane is provided with hydraulic power and means for moving a grappling frame both longitudinally and transversely thereon:
(a) spaced normally substantially vertical grappling legs, each vertical leg comprising relatively movable members for extension and retraction,
(b) a horizontal sliding connection including relatively movable members between said vertical legs,
(c) power means for extending and retracting said horizontal connection,
(d) power means for each of said legs for extending and retracting said relatively movable members on said legs,
(e) hydraulic cylinder means connecting to said grappling frame for raising and lower same, (f) bearing pads between said relatively movable members of said vertical grappling legs and said horizontal sliding connection and an adjustable bearing pin therebetween.

17. In a safety interlock means for a gantry crane:
(a) interlock means including a sensing device mounted on said rotational frame, said means including a movable arm,
(b) contact means contacted by said arm for indicating the presence in an unsafe area, said contact means including a wheel on said arm and a track,
(c) and a hydraulic means operated by said arm for preventing operation in said unsafe area, including a pair of opposed hydraulic valves,
(d) there being a cam plate in whch said arm operates in said track,
(e) said valves operated by said arm movable in said cam plate, whereby said valves are contacted and actuated when said member moves into a certain position in said track in said cam plate.

References Cited

UNITED STATES PATENTS

| | | | |
|---|---|---|---|
| 2,936,907 | 5/1960 | Woodruff | 212—13 |
| 2,974,757 | 3/1961 | Polanin | 188—203 |
| 3,051,321 | 8/1962 | Ransden | 212—14 |
| 3,176,853 | 4/1965 | Baudhuin | 212—14 |
| 3,190,237 | 6/1965 | Hurtner | 188—153 |
| 3,247,974 | 4/1966 | Dechantsreiter | 212—14 |
| 3,262,580 | 7/1966 | Markowitz | 212—13 |
| 2,735,713 | 2/1956 | Blakeley | 294—67 |
| 3,252,589 | 5/1966 | Keene | 212—20 |
| 3,262,595 | 7/1966 | Seip | 294—67 |

RICHARD E. AEGERTER, *Primary Examiner.*

HARVEY C. HORNSBY, *Assistant Examiner.*

U.S. Cl. X.R.

188—203; 294—67